(12) United States Patent
Fu

(10) Patent No.: US 9,696,959 B2
(45) Date of Patent: Jul. 4, 2017

(54) DISPLAY DEVICE AND POSITIONING METHOD

(71) Applicants: Qisda (Suzhou) Co., Ltd., Suzhou (CN); Qisda Corporation, Taoyuan (TW)

(72) Inventor: Wei-Feng Fu, Taoyuan (TW)

(73) Assignees: Qisda (Suzhou) Co., LTD., Suzhou (CN); Qisda Corporation, Taoyuan (TW)

( * ) Notice: Subject to any disclaimer, the term of this patent is extended or adjusted under 35 U.S.C. 154(b) by 0 days.

(21) Appl. No.: 14/645,374

(22) Filed: Mar. 11, 2015

(65) Prior Publication Data

US 2015/0268918 A1 Sep. 24, 2015

(30) Foreign Application Priority Data

Mar. 21, 2014 (TW) .............................. 103110730 A

(51) Int. Cl.
*G06F 3/14* (2006.01)
*G06G 5/00* (2006.01)
*G09G 5/00* (2006.01)

(52) U.S. Cl.
CPC ........... *G06F 3/1446* (2013.01); *G09G 5/003* (2013.01); *G09G 2320/08* (2013.01); *G09G 2330/08* (2013.01); *G09G 2356/00* (2013.01); *G09G 2370/16* (2013.01)

(58) Field of Classification Search
CPC .... G06F 3/1423; G06F 3/1431; G06F 3/1446; G09G 5/003; G09G 2300/026; G09G 2340/04; G09G 2370/00; G09G 2320/08; G09G 2330/08; G09G 2356/00; G09G 2370/16

USPC .................................... 345/661, 1.1, 1.2, 1.3
See application file for complete search history.

(56) References Cited

U.S. PATENT DOCUMENTS

| 2004/0036662 | A1* | 2/2004 | Sakumura | ................ G09G 5/14 345/1.3 |
| 2010/0097379 | A1* | 4/2010 | Choi | ...................... G09G 5/363 345/428 |
| 2010/0117805 | A1* | 5/2010 | Jeon | ..................... G06K 7/0008 340/10.4 |

(Continued)

FOREIGN PATENT DOCUMENTS

| CN | 101312514 A | 11/2008 |
| CN | 102592528 A | 7/2012 |

(Continued)

*Primary Examiner* — Ke Xiao
*Assistant Examiner* — Jed-Justin Imperial

(57) ABSTRACT

A display device receiving an image is provided. The display device includes a micro control unit and a plurality of transceivers. The plurality of transceivers are disposed in a plurality of corners of the display device respectively and connected with the micro control unit. When the display device corporately display the image with a plurality of the display devices, the transceivers in the display device detects detected information from the transceivers in the adjacent display devices, and the micro control unit determines an absolute coordinate information of the display device according to the detected information, wherein the display device displays a portion of the image according to the absolute coordinate information of the display device.

13 Claims, 5 Drawing Sheets

(56) References Cited

U.S. PATENT DOCUMENTS

2010/0302129 A1* 12/2010 Kastrup ................ G06F 3/1446
  345/1.3
2011/0122048 A1   5/2011 Choi et al.
2014/0232616 A1*  8/2014 Drake ..................... H04B 5/02
  345/1.2

FOREIGN PATENT DOCUMENTS

CN    103258521 A    8/2013
TW    M418495 U    12/2011

* cited by examiner

DISPLAY DEVICE AND POSITIONING METHOD

FIELD OF THE INVENTION

The present invention relates to a display device, and more particularly to a display device capable of automatically positioning other display devices to corporately display an image.

BACKGROUND OF THE INVENTION

In a conventional TV wall system, the corresponding position and enlargement scale of each display device must be adjusted individually and manually so as to make the image corresponding to the image signal capable of being displayed correctly. However, adjusting each display device in a manual manner is quite complicated and may cause errors, and consequentially, some or all of these display devices may not display images correctly.

Thus, a conventional TV wall system equipped with sensors in each display device is developed. FIG. 1 is a schematic diagram of a conventional TV wall system. As shown in FIG. 1, each one of the display devices D1~D9 has four sensors T1~T4, which are respectively installed on the four edges of each display device. Through the aforementioned sensor arrangement on each one of the display devices D1~D9, each sensor can only transmit signals to or detect one adjacent sensor. For example, the sensor T4 in the display device D3 can only transmit signals to or detect signals from the sensor T1 in the display device D6 and the sensor T3 in the display device D3 can only transmit signals to or detect signals from the sensor T2 in the display device D2. Thus, once the display devices D2, D6 are out of order or malfunctioning, the display device D3 cannot receive signal normally and consequentially the display device D3 is not able to display a respective part of an image correctly.

SUMMARY OF THE INVENTION

Therefore, one object of the present invention is to provide a display device capable of solving the aforementioned problem in prior art.

The present invention provides a display device receiving an image. The display device includes a micro control unit and a plurality of transceivers. The plurality of transceivers are disposed in a plurality of corners of the display device respectively and connected with the micro control unit. When the display device corporately display the image with a plurality of the display devices, the transceivers in the display device detects detected information from the transceivers in the adjacent display devices, and the micro control unit determines an absolute coordinate information of the display device according to the detected information, wherein the display device displays a portion of the image according to the absolute coordinate information of the display device.

The present invention further provides a method for positioning a plurality of display devices, wherein the plurality of display devices corporately display an image. The method includes steps of: disposing a plurality of transceivers in a plurality of corners of each display device, respectively; configuring the transceivers of each display device to detect a coordinate position transmitted from the one or more transceivers of the adjacent display devices; obtaining an absolute coordinate information for each of the display device according to a detected result of the transceivers of the display device; providing an image to the plurality of display devices; and configuring each display device to display a respective part of the image according to the absolute coordinate information.

The present invention still further provides a display device receiving an image. The display device includes a micro control unit, a first transceiver, a second transceiver, a third transceiver and a fourth transceiver. The first transceiver is disposed in a top left corner of the display device. The second transceiver is disposed in a bottom left corner of the display device. The third transceiver is disposed in a bottom right corner of the display device. The fourth transceiver is disposed in a top right corner of the display device. The first, the second, the third and the fourth transceivers are signal connected to the micro control unit. When the display device and a plurality of the display device are arranged as a matrix, the display device defines its coordinate position according to the coordinate position of the adjacent display device and a direction where the display device receives the coordinate position from the adjacent display device. The display device displays a respective part of the image according to the coordinate position of the display device.

For making the above and other purposes, features and benefits become more readily apparent to those ordinarily skilled in the art, the preferred embodiments and the detailed descriptions with accompanying drawings will be put forward in the following descriptions.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
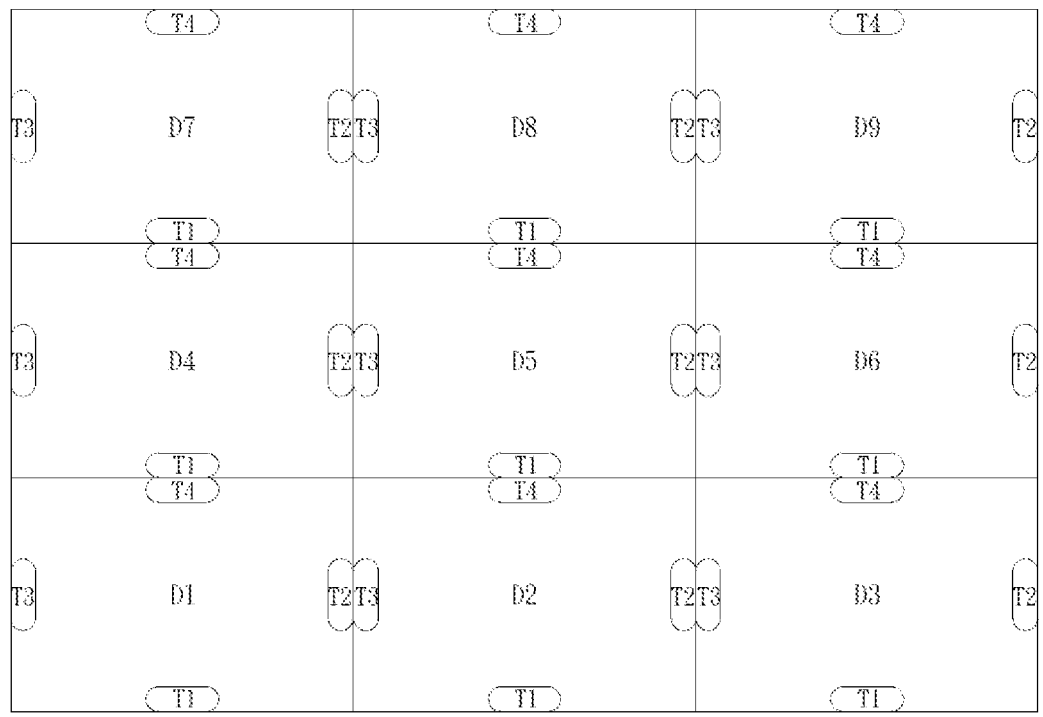
FIG. 1 is a schematic diagram of a conventional TV wall system.
Figure 2:
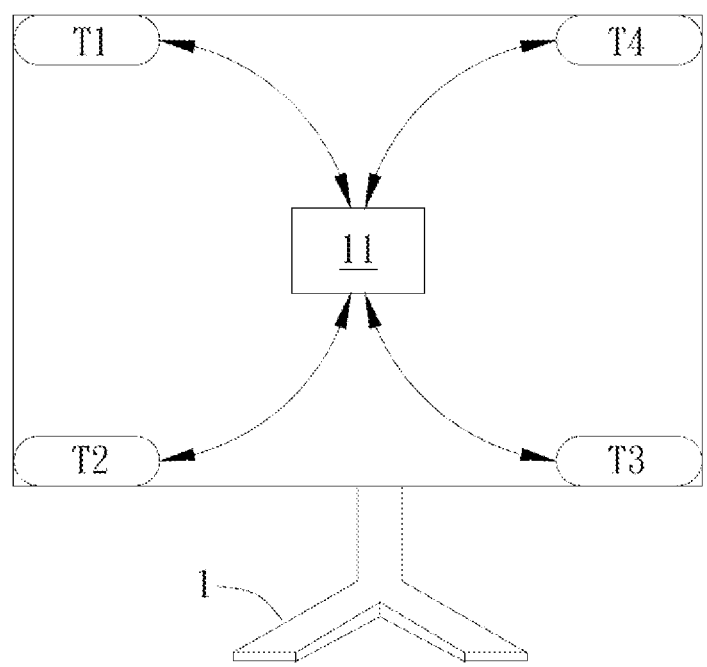
FIG. 2 is a schematic diagram of a display device in accordance with an embodiment of the present invention.

FIG. 2 is a schematic diagram of a display device in accordance with an embodiment of the present invention. As shown in FIG. 2, the display device 1 in the present embodiment has a rectangular frame with four corners. The display device 1 includes a micro control unit (MCU) 11 and a plurality of transceivers T1, T2, T3 and T4. The transceivers T1~T4 are disposed in the four corners of the display device 1, respectively, each transceiver is close to the connection point of two edges. In one embodiment, the micro control unit 11 is signal connected with each one of the transceivers T1~T4 by way of inter-integrated circuit (I2C); however, the present invention is not limited thereto. In addition, the transceivers T1~T4 may be non-contact transceivers, such as near field communication (NFC) transceivers or infrared (IR) transceivers; however, the present invention is not limited thereto. In the present embodiment, the transceivers T1~T4 are NFC transceivers. It is to be noted that the signal transmitting or receiving of a transceiver can be defined or updated by firmware.

Figure 3:
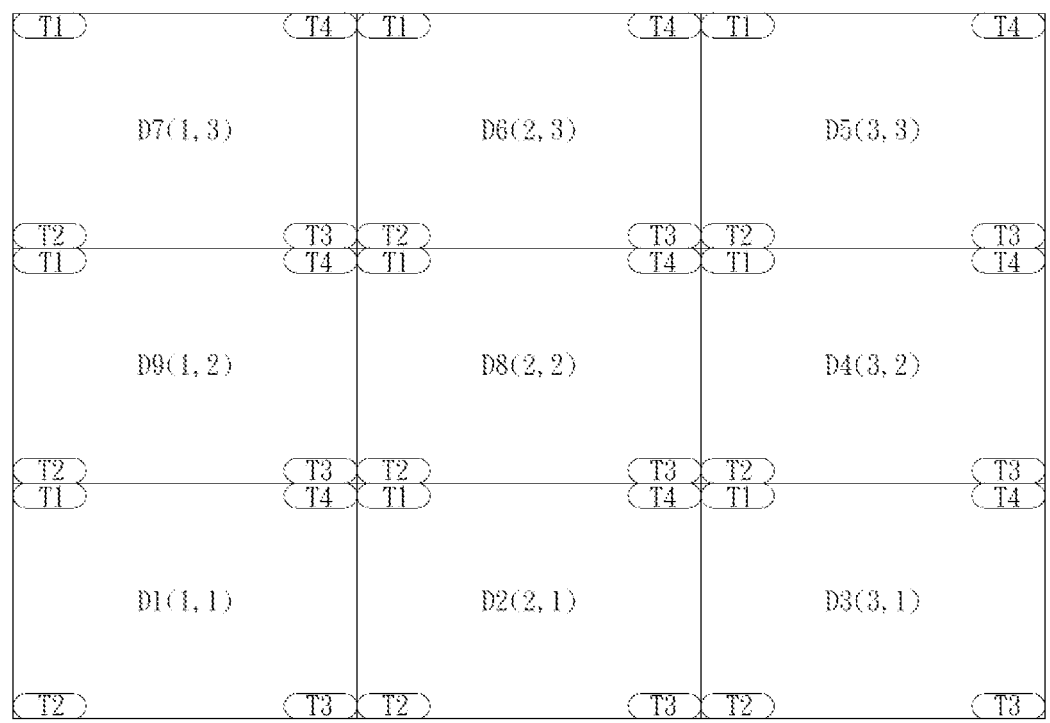
FIG. 3 is a schematic diagram of a 3×3 display system in accordance with an embodiment of the present invention.

FIG. 3 is a schematic diagram of a 3×3 display system in accordance with an embodiment of the present invention; wherein the 3×3 display system of FIG. 3 is formed by a plurality of display devices 1 of FIG. 2 being arranged as a matrix. As shown in FIG. 3, the display system in the present embodiment is formed by the display devices D1~D9 arranged in a 3×3 matrix. In addition, it is to be noted that each of the display devices D1~D9 can have the signal or information exchange only with its adjacent display devices. Moreover, because the effective signal emission distance in NFC technology is about 20 cm, the emission strength of each transceiver located in one corner does not affect the operation of the transceiver in the far corner. In this embodiment, the aforementioned signal or information exchange is specifically referred to the control signal or image signal exchange; however, the present invention is not limited thereto. Each two of the adjacent transceivers T1~T4 can detect with each other and the micro control units 11 defines the coordinate position of the respective display device. Then, once the coordinate positions of all the display devices D1~D9 are defined, an absolute coordinate information of the display devices D1~D9 (such as the amount or number of the plurality of display devices, a size of the matrix and the coordinate positions of all the display devices) is obtained. The process or mechanism for defining the absolute coordinate information of a plurality of display devices will be described in detail as follow with reference to related figures.

Figure 4A:
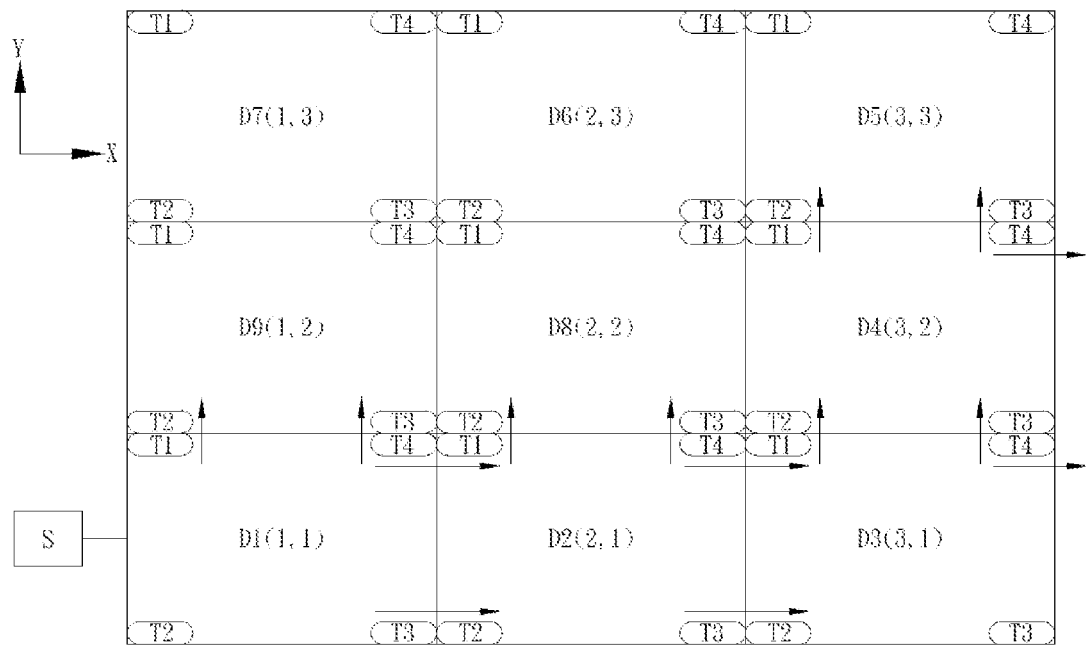
FIG. 4A is a schematic diagram for illustrating the process or mechanism for defining the absolute coordinate information of a plurality of display devices in a 3×3 display system in accordance with an embodiment of the present invention.

Please refer to FIG. 4A, which is a schematic diagram for illustrating the process or mechanism for defining the absolute coordinate information of a plurality of display devices in a positioning display system in accordance with an embodiment of the present invention. As shown in FIG. 4A, the positioning display system further includes an image source device S for providing the same image signal to all of the display devices D1~D9 (when combined together as a whole). The transceivers T1~T4, respectively disposed in the four corners of each of the display devices D1~D9, detect whether there exists any transceiver nearby. Specifically, because the transceiver T2 of the display device D1 detects no any nearby transceiver, the display device D1 may be set as the first display device with a starting coordinate position in the positioning display system. That is, the coordinate position (x, y) of the display device D1 is defined as (1, 1). It is to be noted that any display device can be defined as the first display device with the starting coordinate position when this display device is located in any corner of the positioning display system and has at least one transceiver without detecting any nearby transceiver. For example, as shown in FIG. 4A, each one of the display devices D1, D3, D5 and D7 can be selected as the first display device with the starting coordinate position.

Once the location of the starting coordinate position (or the first display device) in the display system is defined, the second display device adjacent to the first display device will be sequentially defined by transmitting the starting coordinate position of the first display device in either the X-axis or Y-axis directions. For example, as shown in FIG. 4A, the display device D2 is defined as the second display device in the positioning display system if the starting coordinate position (1, 1) of the first display device (i.e., the display device D1) is transmitted in the X-axis direction through the transceivers T3, T4 of the first display device (i.e., the display device D1). Alternatively, the display device D9 is defined as the second display device in the positioning display system if the starting coordinate position (1, 1) of the first display device (i.e., the display device D1) is transmitted in the Y-axis direction through the transceivers T1, T4 of the first display device (i.e., the display device D1). It is to be noted that the coordinate position of the second display device is determined according to the starting coordinate position of the first display device and the direction where the second display device receives the starting coordinate position from the first display device.

For example, as shown in FIG. 4A, if the X-axis direction is selected for the transmission of the starting coordinate position of the first display device (i.e., the display device D1), the transceivers T2, T1 of the display device D2 receive the starting coordinate position (1, 1) of the first display device (i.e., the display device D1) from the transceivers T3, T4 of the first display device (i.e., the display device D1), respectively, and accordingly, the display device D2 is defined as the second display device in the positioning display system, and has a coordinate position (2, 1), which is obtained by adding the X-axis element of the starting coordinate position (1, 1) of the first display device (i.e., the display device D1) by 1. Alternatively, if the Y-axis direction is selected for the transmission of the starting coordinate position of the first display device (i.e., the display device D1), the transceivers T2, T3 of the display device D9 receive the starting coordinate position (1, 1) of the first display device (i.e., the display device D1) from the transceivers T1, T4 of the first display device (i.e., the display device D1), respectively, and accordingly, the display device D9 is defined as the second display device in the positioning display system, and has a coordinate position (1, 2), which is obtained by adding the Y-axis element of the starting coordinate position (1, 1) of the first display device (i.e., the display device D1) by 1. In the present embodiment, the display device D2 is exemplarily defined as the second display device in the positioning display system.

Once the second display device in the positioning display system is defined, the third display device adjacent to the second display device will be sequentially defined. Based on the same manner or procedure, the coordinate position (2, 1) of the second display device (i.e., the display device D2) is transmitted to the adjacent display devices in either the X-axis or Y-axis directions. It is to be noted that to avoid transmitting the coordinate position (2, 1) of the second display device (i.e., the display device D2) back to the first display device (i.e., the display device D1) so as resulting in error definition, the second display device (i.e., the display device D2) is configured not to transmit its coordinate position (2, 1) in the direction where the second display device (i.e., the display device D2) receives the coordinate position from the first display device (i.e., the display device D1). In other words, the second display device (i.e., the display device D2) will not transmit its coordinate position (2, 1) back to the first display device (i.e., the display device D1). As described above, because the transceivers T2, T1 of the display device D3 receive the coordinate position (2, 1) from the transceivers T3, T4 of the display device D2, respectively, the display device D3 is defined as the third display device in the positioning display system, and has a coordinate position (3, 1), which is obtained by adding the X-axis element of the coordinate position (2, 1) of the second display device (i.e., the display device D2) by 1.

Because the transceivers T4, T3 of the third display device D3 detect no transceiver (or display device) to be existing in the positive X-axis direction, the coordinate position (3, 1) of the third display device (i.e., the display device D3) is transmitted to the adjacent display device in the Y-axis directions. Because the transceivers T2, T3 of the display device D4 receive the coordinate position (3, 1) from the transceivers T1, T4 of the display device D3, respectively, the display device D4 is defined as the fourth display device in the positioning display system, and has a coordinate position (3, 2), which is obtained by adding the Y-axis element of the coordinate position (3, 1) of the third display device (i.e., the display device D3) by 1.

Once the fourth display device in the positioning display system is defined, the fifth display device adjacent to the fourth display device will be sequentially defined. Based on the same manner or procedure, the coordinate position (2, 1) of the second display device (i.e., the display device D2) is transmitted to the adjacent display device in either the X-axis or Y-axis directions. Based on the same manner, the coordinate position (3, 2) of the fourth display device (i.e., the display device D4) is transmitted to the adjacent display device in either the X-axis or Y-axis directions. In the present embodiment, the coordinate position (3, 2) of the fourth display device (i.e., the display device D4) is transmitted in the X-axis direction selectively. Because the transceivers T2, T3 of the display device D5 receive the coordinate position (3, 2) from the transceivers T1, T4 of the display device D4, respectively, the display device D5 is defined as the fifth display device in the positioning display system and has a coordinate position (3, 3), which is obtained by adding the Y-axis element of the coordinate position (3, 2) of the fourth display device (i.e., the display device D4) by 1. According to this definition manner or procedure, the sixth to the ninth display devices (D6 to D9) in the positioning display system can be sequentially defined, and no redundant detail is to be given herein. Once the coordinate positions of all the display devices are determined, the absolute coordinate information of the positioning display system is determined. As a result, the display devices positioning display system can communicate with one another and corporately display an image correctly.

It is to be noted that when the coordinate position is accumulated to the maximum value, the maximum coordinate position is transmitted to all of the display devices in the positioning display system and the absolute coordinate information of the display devices D1~D9 is determined. Accordingly, the amount or number of the display devices in the positioning display system and the size of the matrix formed by the display devices are determined. For example, in the present embodiment, the maximum coordinate position is (3, 3); thus, the amount of the display devices in the positioning display system is nine and the matrix formed by the display devices is a 3×3 matrix. As a result, the micro control unit of each display device can determine the enlargement scale, the display position and the display area of the image signal. For example, once the display device D1 determines that it has a coordinate position (1, 1) and the absolute coordinate information indicates that the positioning display system is a 3×3 matrix, the micro control unit 1 of the display device D1 can determines the respective part of the image should be displayed on the display device D1.

Figure 4B:
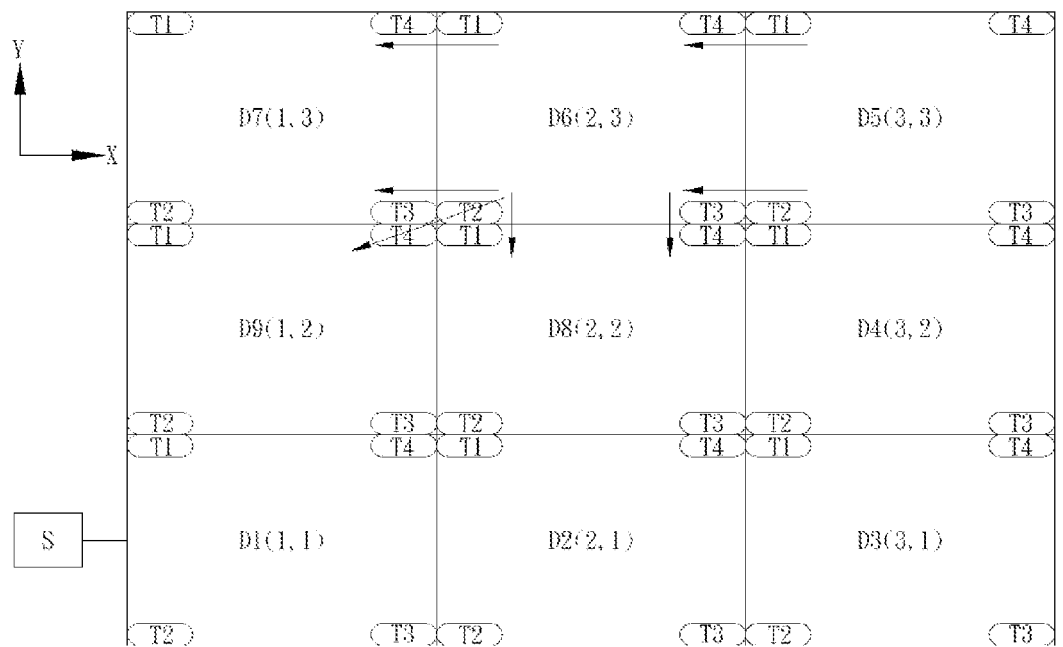
FIG. 4B is a schematic diagram for illustrating the process or mechanism for defining the absolute coordinate information of a plurality of display devices in a 3×3 display system in accordance with another embodiment of the present invention.

In the previous embodiment, for example, the display device D6 may transmit its coordinate position (2, 3) to the display device D7 through its transceivers T1, T2 in the (negative) X-axis direction; and accordingly the display device D7 has a coordinate position (1, 3). Or, the display device D6 may transmit its coordinate position (2, 3) to the display device D8 through its transceivers T2, T3 in the (negative) Y-axis direction; and accordingly the display device D8 has a coordinate position (2, 2). Please refer to FIG. 4B, which is a schematic diagram for illustrating the process or mechanism for defining the absolute coordinate information of a plurality of display devices in a positioning display system in accordance with another embodiment of the present invention. As shown in FIG. 4B, the display device D6 can diagonally transmit its coordinate position (2, 3) to the display device D9 through its transceiver T2; and accordingly the display device D9 has a coordinate position (1, 2), which is obtained by subtracting both of the X-axis and Y-axis elements of the coordinate position (2, 3) of the display device D6 by 1. It is to be noted that at least one of the transceivers in one display device is signal connected to the three adjacent transceivers respectively disposed in the three adjacent display devices. For example, as shown in FIG. 4B, the transceiver T4 of the display device D1 is signal connected to the transceiver T1 of the display device D2, the transceiver T2 of the display device D8 and the transceiver T3 of the display device D9. In addition, the transceiver T2 of the display device D8 is referred to as a diagonal transceiver with respective to the transceiver T4 of the display device D1, and the display device D8 is referred to as a diagonal display device with respective to the display device D1.

By transmitting signal in a diagonal manner, some advantages can be achieved. For example, the signal transmission time is reduced and the firmware can have better foolproof effect in operation. Additionally, for example, even when the display devices D2, D4 are out of order or experiencing malfunctioning, the display device D3 can have signal or information exchange with the display device D8 and consequentially is able to display a respective part of an image correctly.

It is to be noted that the transceivers T1~T4 of each display device can transmit signals to all the adjacent transceivers, so that some of the display devices may be detected or defined more than one time. For example, as illustrated in FIG. 4B, the display device D8 may receive signals from the display devices D1, D2 and D9. However, in practice, the display device D8 can determine its coordinate position by any one of the signals transmitted from the display devices D1, D2 and D9; thus, the remaining two signals are calculated repeatedly. To avoid the aforementioned repeating calculation issue, a simplified algorithm may be written into the micro control unit 11 by software or programming in advance, so that the optimum calculation can be achieved and the unnecessary use of resources can be avoided.

Based on the structure of the aforementioned positioning display system, one of the plurality of display devices may further provide an on-screen display (OSD) menu. In addition, each of the plurality of display devices is selectively operated in a stand-alone mode and an online mode can be selected.

In the stand-alone mode, no signal or information is exchanged between each two adjacent display devices through the related transceivers; and accordingly, each display device can be configured or adjusted (for example, the parameter adjustment or other related settings, such as brightness, contrast and saturation) individually.

In the online mode, signal or information can be exchanged between each two adjacent display devices through the related transceivers; and accordingly, all the display devices can be configured or adjusted simultaneously. That is, a user can simultaneously configure or adjust all the display devices through adjusting the parameters or other settings of one display device only.

In the online mode, it is to be noted that the simultaneous configuration or adjustment of all the display devices is not necessary to be initiated from the display device with the starting position in the present invention. For example, a user can select the display device D5 to initiate the simultaneous configuration or adjustment. Once the display device D5 is configured or adjusted, the parameters or related setting of the display device D5 is transmitted back to the display device D1 with the starting coordinated position; and consequentially, all the remaining display devices are simultaneously configured or adjusted in sequence. Therefore, the OSD menu can be equipped into any selected display device, so that the positioning display system of the present invention can be operated more conveniently without the complicated definition.

Figure 5:
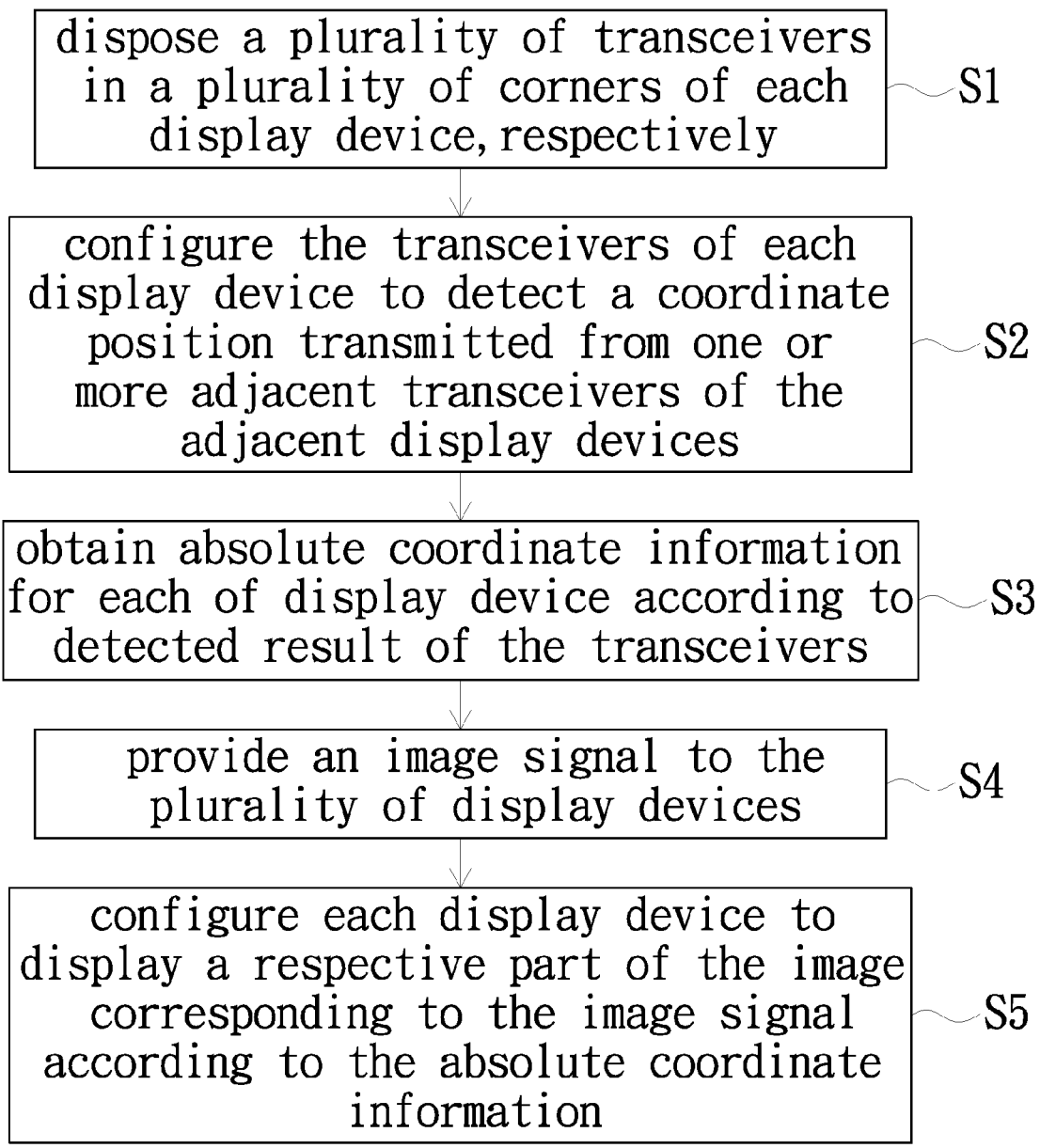
FIG. 5 is a flowchart illustrating a method of positioning a plurality of display devices in accordance with an embodiment of the present invention.

Please refer to FIG. 5, which is a flowchart illustrating a method of positioning a plurality of display devices in a positioning display system in accordance with an embodiment of the present invention. The structure of the positioning display system has been described above, and no redundant detail is to be given herein. As shown, the method in the present embodiment includes steps of: disposing a plurality of transceivers in a plurality of corners of each display device, respectively (step S1); configuring the transceivers of each display device to detect a coordinate position transmitted from one or more adjacent transceivers of the adjacent display devices (step S2); obtaining absolute coordinate information for each of display device according to detected result of the transceivers (step S3); providing an image signal to the plurality of display devices (step S4); and configuring each display device to display a respective part of the image corresponding to the image signal according to the absolute coordinate information (step S5).

Compared with the prior art, the display devices in the positioning display system of the present invention can have signal or information exchange through the micro control unit and the transceivers and accordingly the absolute coordinate information of the display devices in the positioning display system is defined. Thus, according to the absolute coordinate information, the display position, the enlarged scale (factor) and the display area of the image signal can be automatically determined. In addition, through being equipped with the on-screen display function, the image signal can be displayed more correctly and the positioning display system of the present invention can be operate more conveniently.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. A display device receiving an image, the display device comprising:
a micro control unit; and
a plurality of transceivers, disposed in a plurality of corners of the display device respectively and connected with the micro control unit, when the display device corporately displaying the image with a plurality of the display devices, the transceivers in the display device detecting a detected information from transceivers in the adjacent display devices, a first display device in the plurality of display devices has a starting coordinate position, the transceivers of the first display device selectively transmit the starting coordinate position to a second display device in the plurality of display devices in a X-axis direction and a Y-axis direction, the second display device is disposed adjacent to the first display device, the second display device determines a second coordinate position of the second display device in accordance with the starting coordinate position and a direction where the second display device receives the starting coordinate position from the first display device, the micro control unit determining an absolute coordinate information of the display device according to the detected information, a third display device of the plurality of display devices has a third coordinate position, the transceivers of the third display device transmit the third coordinate position to a fourth display device adjacent to the third display device selectively in the X-axis direction and the Y-axis direction, the fourth display device determines a fourth coordinate position of the fourth display device according to the third coordinate position and a direction where the fourth display device receives the third coordinate position from the third display device, the transceivers of the fourth display device transmits the fourth coordinate position to a fifth display device adjacent to the fourth display device selectively in the X-axis direction and the Y-axis direction, wherein the fourth coordinate position is not transmitted in the direction where the fourth display device receives the third coordinate position, a fifth display device of the plurality of display devices has a fifth coordinate position, the fifth display device transmits the fifth coordinate position to a sixth display device adjacent to the fifth display device selectively in the X-axis direction and the Y-axis direction, the sixth display device of the plurality of display devices has a sixth coordinate position, a first transceiver and a second transceiver of the sixth display device transmit the sixth coordinate position of the sixth display device to a seventh display device in the X-axis direction, wherein the seventh display device is adjacent to the sixth display device, the second transceiver and a third transceiver of the sixth display device transmit the sixth coordinate position of the sixth display device to an eighth display device in the Y-axis direction, wherein the eighth display device is adjacent to the sixth display device, the second transceiver of the sixth display device transmits the sixth coordinate position of the sixth display device to a ninth display device diagonally adjacent to the sixth display device, a seventh coordinate position of the seventh display device is determined according to the sixth coordinate position and a direction where the seventh display device receives the sixth coordinate position from the sixth display device, an eighth coordinate position of the eighth display device is determined according to the sixth coordinate position and a direction where the eighth display device receives the sixth coordinate position from the sixth display device, a ninth coordinate position of the ninth display device is determined according to the sixth coordinate position and a direction where the ninth display device receives the sixth coordinate position from the sixth display device, wherein the display device displays a portion of the image according to the absolute coordinate information of the display device.

2. The display device according to claim 1, wherein the plurality of display devices determine an enlargement scale, a display area of the image according to the absolute coordinate information.

3. The display device according to claim 1, wherein the display device comprises four transceivers respectively disposed in the four corners of the display device, wherein at least one of the transceiver of the display device is signal connected to the transceiver of the diagonal display device with respective to the display device, which is located diagonal with respective to the at least one transceiver of the display device.

4. The display device according to claim 1, wherein each transceiver is a non-contact transceiver.

5. The display device according to claim 1, the display device further comprising an OSD menu, wherein the display device is selectively operated in a stand-alone mode and an online mode, wherein in the stand-alone mode, the plurality of transceivers of the plurality of display devices stop transmitting or receiving signals between one another, and each display device is configured or adjusted individually through the OSD menu, wherein in the online mode, the plurality of transceivers of the plurality of display devices transmit or receive signals between one another, and all of the plurality of display devices is configured or adjusted synchronously through the OSD menu.

6. A method for positioning a plurality of display devices, the plurality of display devices corporately displaying an image, the method comprising steps of:
disposing a plurality of transceivers in a plurality of corners of each display device, respectively;
configuring the transceivers of each display device to detect a coordinate position transmitted from the one or more transceivers of the adjacent display devices;
obtaining an absolute coordinate information for each of the display device according to a detected result of the transceivers of the display device;
providing an image to the plurality of display devices;
configuring each display device to display a respective part of the image according to the absolute coordinate information;
selecting one of the plurality of display devices as a first display device, wherein the first display device has a starting coordinate position;
configuring the transceivers of the first display device to transmit the starting coordinate position of the first display device to a second display device of the plurality of display devices selectively in a X-axis direction and a Y-axis direction, wherein the second display device is adjacent to the first display device;
configuring the second display device to determine a second coordinate position of the second display device according to the starting coordinate position and a direction where the second display device receives the starting coordinate position from the first display device;
defining a third display device of the plurality of display devices, wherein the third display device has a third coordinate position;
configuring the transceivers of the third display device to transmit the third coordinate position of the third display device to a fourth display device selectively in the X-axis direction and the Y-axis direction, wherein the fourth display device is adjacent to the third display device;
configuring the fourth display device to determine a fourth coordinate position of the fourth display device according to the third coordinate position and a direction where the fourth display device receives the third coordinate position from the third display device;
configuring the transceivers of the fourth display device to transmitting the fourth coordinate position to the display device adjacent to the fourth display device selectively in the X-axis direction and the Y-axis direction, wherein the fourth coordinate position is not transmitted in the direction where the fourth display device receives the third coordinate position;
defining a fifth display device of the plurality of display devices, wherein the fifth display device has a fifth coordinate position;
configuring the fifth display device to transmit the fifth coordinate position back to all the display devices when the coordinate positions of the adjacent display devices are all determined;
obtaining the absolute coordinate information of the plurality of display device according to the determined coordinate positions of the plurality of display devices and the fifth coordinate position;
defining a sixth display device of the plurality of display devices, wherein the sixth display device has a sixth coordinate position;
configuring a first transceiver and a second transceiver of the sixth display device to transmit the sixth coordinate position of the sixth display device to a seventh display device in the X-axis direction, wherein the seventh display device is adjacent to the sixth display device;
configuring the second transceiver and a third transceiver of the sixth display device to transmit the sixth coordinate position of the sixth display device to an eighth display device in the Y-axis direction, wherein the eighth display device is adjacent to the sixth display device;
configuring the second transceiver of the sixth display device to transmit the sixth coordinate position of the sixth display device to a ninth display device, wherein the ninth display device is diagonally adjacent to the sixth display device;
configuring the seventh display device to determine a seventh coordinate position of the seventh display device according to the sixth coordinate position and a direction where the seventh display device receives the sixth coordinate position from the sixth display device and configuring the eighth display device to determine an eighth coordinate position of the eighth display device according to the sixth coordinate position and a direction where the eighth display device receives the sixth coordinate position from the sixth display device; and
configuring the ninth display device to determine a ninth coordinate position of the ninth display device according to the sixth coordinate position and a direction where the ninth display device receives the sixth coordinate position from the sixth display device.

7. The method according to claim 6 wherein the plurality of display device are arranged as a matrix, the first display device is disposed in a first corner of the matrix, the fifth display device is disposed in a second corner of the matrix, and the first and second corners are diagonal to each other.

8. The method according to claim 7, wherein the absolute coordinate information comprise an amount of the plurality of display devices, a size of the matrix and the coordinate positions of all the display devices, wherein the amount of the display devices and the size of the matrix are calculated according to the fifth coordinate position of the fifth display device.

9. The method according to claim 8, further comprising:
configuring the plurality of display devices to determine an enlargement scale, a display area and a display position of the image signal according to the absolute coordinate information.

10. The method according to claim 9, wherein each display device comprises four transceivers disposed in four corners of the display device, wherein at least one of the transceiver of the display device is signal connected to the adjacent transceivers of the adjacent display device, wherein at least one of the transceiver of the display device is signal connected to the transceiver, of the diagonal display device with respective to the display device, which is located diagonal with respective to the at least one transceiver of the display device.

11. The method according to claim 6, wherein the seventh coordinate position is obtained by subtracting the X-axis element of the sixth coordinate position of the sixth display device by one, the eighth coordinate position is obtained by subtracting the Y-axis element of the sixth coordinate position of the sixth display device by one, and the ninth coordinate position is obtained by subtracting both of the X-axis and Y-axis elements of the sixth coordinate position of the sixth display device by one.

12. The method according to claim 6, wherein each of the plurality of display devices is selectively operated in a stand-alone mode and an online mode and has an OSD menu.

13. The method according to claim 12, wherein in the stand-alone mode, no signal is exchanged between the display devices through the related transceivers and each display device is configured or adjust individually, wherein in the online mode, signals is exchanged between adjacent display devices through the related transceivers and all of the plurality of display devices is configured or adjusted simultaneously through the display device with the OSD menu.

* * * * *